March 9, 1948. G. S. CRAMPTON 2,437,458
INSPECTION PERISCOPE
Filed Sept. 18, 1945
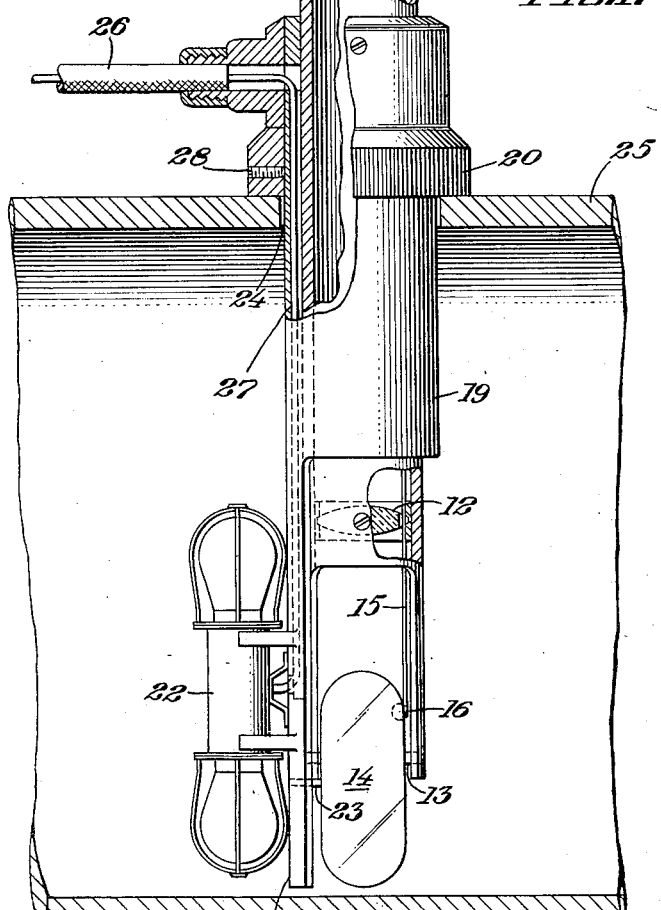
INVENTOR.
George S. Crampton
BY
Robert A. Saunders Patented Mar. 9, 1948

2,437,458

UNITED STATES PATENT OFFICE 2,437,458

INSPECTION PERISCOPE

George S. Crampton, Philadelphia, Pa., assignor, by mesne assignments, to the United States of America, as represented by the Atomic Energy Commission Application September 18, 1945, Serial No. 617,132

7 Claims. (Cl. 88—71)

The present invention relates to an optical instrument and more particularly to one adapted for the visual inspection of the interiors of containers such as drums or pipes.

When drums or pipes have been installed, it is generally desirable to inspect their interiors prior to placing them in use and this operation is frequently handicapped by the absence of sufficient suitable viewing orifices through which the interior may so be inspected. It is generally desirable to utilize for this purpose an orifice which exists for some utilitarian purpose such as a connecting conduit or the like. Accordingly, it is an object of this invention to provide an apparatus or device which makes it possible to inspect the interior of a closed container through a relatively small orifice in the wall thereof. Another object of the invention is to provide a viewing device so constructed and arranged that a maximum sized instrument may be employed in connection with a minimum sized opening or orifice. Other objects and advantages of the invention will be apparent from the following description when read in connection with the accompanying drawing in which Figure 1 is a side elevation partly in section of the preferred embodiment of the invention in position for use in inspecting the interior of a pipe and Figure 2 is a fragmentary view partly in section showing the manner in which the inspecting device is inserted through an orifice.

The preferred embodiment of the invention as shown in the drawing comprises a tubular member 10 in which are suitably mounted an ocular lens 11 and objective lens 12 axially spaced in telescopic relation. The end of the tube 10 extends beyond the objective 12 in bifurcated form between the arms of which is mounted a rod or pin 13 which rotatively supports a light deflecting member 14 which preferably is a mirror. In order that the mirror 14 may be rotated as desired, a connecting rod such as heavy piano wire 15 has one of its ends connected to a pin 16 secured to the mirror 14 at a point removed from its axis of rotation and has its other end secured to a slide button 17 mounted for axial movement in a slot 18 provided in the wall of the tube 10 in the neighborhood of the ocular 11.

The tube 10 which comprises the casing of the telescope is surrounded by and fits into an outer casing 19 which is provided with a collar member 20 for limiting the penetration of the instrument through a viewing orifice as hereinafter described. As shown in the drawing, the lower end of the outer casing 19 is cut away except for a small segment 21 which supplies a support upon which a lamp assembly 22 is suitably mounted. This segment 21 is provided with an embossing 23 to provide a stop limiting the movement of the telescope casing 10.

In accordance with the invention the telescope casing 10 is retractable into the outer casing 19 to displace it axially with respect to the lamp assembly 22 so that the lamp assembly 22 may be inserted through a restricted orifice 24 provided in a pipe 25, the interior of which is to be inspected. As illustrated in Figure 2, after the lamp assembly 22 has passed through the orifice 24, the instrument is movable laterally to aline the outer casing 19 with the orifice 24 so that it may then be inserted through the orifice 24. When in this latter position the telescope casing 10 is lowered against its stop member 23 as shown in Figure 1 and the apparatus is in position for the episcopic inspection of the interior of the pipe 25. A portion of the wall of the pipe 25 is directly viewable through the telescope when the mirror 14 occupies a plane which includes the optic axis of the telescope. This position is shown in Figure 1. For scanning the other portions of the wall of the interior of pipe 24, the mirror 14 is rotated by suitably moving the slide button 17 and this movement when correlated with a turning movement of the instrument as a whole makes it possible for the operator to bring into his field of view a spherical angle of 360°.

As mentioned above the collar 20 is located on the outer casing 19 in a position to limit the penetration of the instrument through the orifice 24 to the desired extent. The position of the collar 20 lengthwise of the casing 19 is adjustable and after being adjusted to adapt to a particular size pipe 25 it is secured in position by set screw 28. It will be understood that the lamps in the assembly 22 may be energized in any suitable manner and for this purpose, leads 26 are provided which extend to the lamp assembly 22 through a groove 27 formed in the interior surface of the casing 19.

It will be apparent from the above description that the invention provides a structure having an effective size larger than the restricted orifice through which it is adapted to be inserted.

While for the purpose of disclosing the invention a particular embodiment has been described, it will be evident to those skilled in the art that many modifications in structural details may be made without departing from the invention the scope of which is defined in the appended claims.

I claim:

1. An inspection instrument adapted for insertion through a small orifice into an enclosure to be inspected comprising a tube having an external diameter substantially equal to but less than the internal diameter of said orifice, an electric lamp assembly secured to an external surface of said tube and having an overall diameter substantially equal to but less than the diameter of said orifice, said tube having the portion thereof lying laterally adjacent and coextensive with said lamp assembly cut away to permit the insertion of said lamp assembly and attached tube portion through said orifice, after which said lamp may be moved laterally within said enclosure to permit insertion through said orifice of said tube, and a telescope assembly displaceably supported within said tube so that one end of said telescope assembly may be moved into and retracted from said cut away portion of the tube.

2. An inspection instrument adapted for insertion through an orifice of predetermined diameter into an enclosure to be inspected, comprising a tube having a diameter slightly less than said predetermined diameter and having at one end an extension aligned with a small portion of the circumference of the tube, an electric lamp assembly mounted on the external surface of said extension, and a periscope assembly having an objective end and supported within said tube in a position with its objective end alongside said extension, said periscope assembly being displaceable axially in the tube, for retraction from said position to a position where said objective end is spaced axially of the tube from said lamp assembly, and said lamp assembly and extension being of less than said predetermined diameter so as to be insertable through said orifice when the periscope assembly is retracted.

3. An inspection instrument adapted for insertion through a small orifice into an enclosure to be inspected comprising a first elongated tube having an extension at the end thereof, an electric lamp assembly secured externally to said extension, said tube and lamp assembly together having a combined projected cross-sectional area of diameter greater than that of said orifice, but together having no cross-sectional area at any transverse plane of a diameter as great as that of said orifice, whereby said tube and lamp assembly may be serially projected through said orifice into said enclosure, a second elongated tube adapted for insertion within said first tube, said second tube having an ocular lens at the end thereof external of said enclosure and having an objective lens and a light reflecting member positioned at the other end thereof, said light reflecting member being pivoted for movement about an axis transverse of the optical axis of said ocular and objective lenses, and means external of said tubes for moving said member about its pivotal axis.

4. The combination defined in claim 3 above which also includes a collar adjustably positioned on said first tube and adapted to engage the external surface of said enclosure at said orifice to limit the penetration of said first tube into said enclosure.

5. An optical instrument for the episcopic inspection of the interior walls of a substantially closed container through a relatively small access opening therein, comprising a tube, a telescope having an axially alined anterior light deflecting member and adapted to be removably inserted in the tube, a lamp assembly, an axially extending projection at the end of said tube for supporting said lamp assembly in a position axially and laterally displaced from said tube, the tube and the lamp assembly being so proportioned and shaped that the cross-sectional diameter in any plane perpendicular to the axis of the tube is less than the cross-sectional diameter of the access opening with which the instrument is to be used, whereby when the telescope is retracted the lamp assembly and the tube can be passed serially through the access opening and the telescope inserted in the tube.

6. An inspection instrument adapted for insertion through a small orifice into an enclosure to be inspected comprising a tube having an external diameter substantially equal to but less than the internal diameter of said orifice, an electric lamp assembly secured to an external surface of said tube and having an overall diameter substantially equal to but less than the diameter of said orifice, said tube having the portion thereof lying laterally adjacent and coextensive with said lamp assembly cut away to permit the insertion of said lamp assembly and attached tube portion through said orifice, after which said lamp may be moved laterally within said enclosure to permit insertion through said orifice of said tube, and a telescope assembly displaceably supported within said tube so that one end of said telescope assembly may be moved into and retracted from said cutaway portion of the tube, said telescope assembly including an ocular lens at the outer end thereof, an objective lens at the inner end thereof, said lenses defining an optical axis, a pivotally mounted light deflecting element at the extreme inner end of said optical axis, and externally positioned means for controlling the angular position of said element.

7. An inspection instrument adapted for insertion through a small orifice into an enclosure to be inspected comprising a tube having an external diameter substantially equal to but less than the internal diameter of said orifice, an electric lamp assembly secured to an external surface of said tube and having an overall diameter substantially equal to but less than the diameter of said orifice, said tube having a portion thereof lying laterally adjacent and coextensive with said lamp assembly cut away to permit the insertion of said lamp assembly and attached tube portion through said orifice, after which said lamp may be moved laterally within said enclosure to permit insertion through said orifice of said tube, said tube also having a groove formed therein extending from said lamp assembly to the outside of said enclosure for accommodating electric leads for said lamp assembly and a telescope assembly displaceably supported within said tube so that one end of said telescope assembly may be moved into and retracted from said cutaway portion of the tube.

GEORGE S. CRAMPTON.

REFERENCES CITED

The following references are of record in the file of this patent:

UNITED STATES PATENTS

| Number | Name | Date |
|---|---|---|
| 1,947,729 | Morrison | Feb. 20, 1934 |

FOREIGN PATENTS

| Number | Country | Date |
|---|---|---|
| 85,723 | Switzerland | July 1, 1919 |
| 686,007 | France | Apr. 7, 1930 |